United States Patent
Patel et al.

(10) Patent No.: US 7,221,756 B2
(45) Date of Patent: May 22, 2007

(54) CONSTRUCTIONS OF VARIABLE INPUT LENGTH CRYPTOGRAPHIC PRIMITIVES FOR HIGH EFFICIENCY AND HIGH SECURITY

(75) Inventors: Sarvar Patel, Montville, NJ (US); Zulfikar Amin Ramzan, Malden, MA (US); Ganapathy Subramanian Sundaram, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1098 days.

(21) Appl. No.: 10/113,666

(22) Filed: Mar. 28, 2002

(65) Prior Publication Data

US 2003/0191950 A1    Oct. 9, 2003

(51) Int. Cl.
*H04L 9/00* (2006.01)
(52) U.S. Cl. .............................................. 380/37
(58) Field of Classification Search ................. 380/46, 380/45, 44, 268, 37; 726/30, 27
See application file for complete search history.

(56) References Cited

U.S. PATENT DOCUMENTS 5,757,913 A * 5/1998 Bellare et al. .............. 713/168

6,236,729 B1 * 5/2001 Takaragi et al. ............ 380/286
2002/0051537 A1 * 5/2002 Rogaway ...................... 380/46

OTHER PUBLICATIONS

Bellare et al., "On the Construction of Variable-Input-Length Ciphers," Proc. of Fast Software Encryption, Lecture Notes in Comp. Sci. 1636 (1999).
Naor et al., "On the Construction of Pseudo-Random Permutations: Luby-Rackoff Revisited," Journal of Cryptology 12, 1, 29-66 (1999).

* cited by examiner

*Primary Examiner*—Matthew Smithers

(57) ABSTRACT

A hash function is applied to a prefix of a VIL input. The output is added to a suffix of the input. A block cipher is applied to results of the addition. An encryption function is performed on the prefix. The final output is the output of the block cipher and the encryption function. In a second encryption technique, a hash function is applied to an input, and the output of the hash function has first and second portions. A block cipher is applied to the second portion. The output of the block cipher is added to the first portion, and a second function is applied to the result of this first addition. The output of the second function is added to the second portion. An inverse hash function is then applied to the output of the first and second additions, creating an encrypted output.

33 Claims, 5 Drawing Sheets

CONSTRUCTIONS OF VARIABLE INPUT LENGTH CRYPTOGRAPHIC PRIMITIVES FOR HIGH EFFICIENCY AND HIGH SECURITY

FIELD OF THE INVENTION

The present invention relates generally to cryptography, and more particularly, to constructions of variable input length cryptographic primitives for high efficiency and high security.

BACKGROUND OF THE INVENTION

A cryptographic primitive that operates on an input of fixed size is called a Fixed Input Length (FIL) primitive. For example, all block ciphers, which are common FIL primitives, operate on messages of fixed size. Informally, a block cipher is a type of encryption algorithm that transforms a block of unencrypted text (commonly called "plaintext") into a block of encrypted text (commonly called "ciphertext"). The plaintext and ciphertext have the same length when transformed through a block cipher. This transformation takes place under the action of a secret key. Decryption is performed by applying a reverse transformation to the ciphertext block using the same secret key. The length of a block is called the block size, and, for many block ciphers, the block size is 64 or 128 bits.

However, in practice, one is faced with the situation of applying a cryptographic primitive on data of varying lengths. This situation calls for the development of cryptographic primitives called Variable Input Length (VIL) primitives. One particular situation is the need for an encryption algorithm which deals with messages of varying sizes but at the same time preserves the property that the length of the ciphertext equals the length of the plaintext. This situation is very common in Internet applications, where traffic consists of "packets" of varying sizes. If a block cipher is being used for encryption, then the blocks that need to be encrypted could be of varying lengths.

Wireless applications also vary packet sizes. This is due to the fact that the frames of data that are sent to each user may be different lengths from user to user because of the difference in the channel conditions of the users relative to the base station.

One problem associated with constructions made of VIL primitives is that encryption and decryption can take a relatively long time. A second problem associated with these constructions is that certain constructions have relatively inferior security.

A need therefore exists for techniques that provide constructions made of VIL primitives that are efficient and that provide relatively high security.

SUMMARY OF THE INVENTION

Broadly, techniques are presented for the construction of Variable Input Length (VIL) cryptographic primitives that are efficient and provide relatively high security. These techniques are used to encode a message to create an encrypted resultant message and to decode the encrypted resultant message to recreate the original message. One encryption and its corresponding decryption technique is more efficient than a comparable conventional encryption and decryption technique, while a second encryption and its corresponding decryption technique has relatively high security. These constructions may be implemented in any number of ways, such as through hardware devices or computer systems.

In a first aspect of the invention, a technique is used to encrypt a VIL input. This technique is faster than comparable conventional techniques. The technique of the first aspect uses a hash function that is applied to a prefix of the input. The output of the hash function is added to a suffix of the input. A block cipher is applied to results of the addition. An encryption function that uses a random number is performed on the prefix. In one embodiment, the encryption function is a parsimonious encryption function, such as a counter-mode encryption or a cipher block chaining encryption. Additionally, it is preferred, in some embodiments, that the random number be the output of the block cipher. The encrypted output is then the output of the encryption function and the output of the block cipher. The combination of the hash function and a single block cipher is fast compared to comparable conventional encryption techniques on VIL inputs. Thus, the total encryption time is reduced as compared with comparable conventional encryption techniques on VIL inputs.

In a second aspect of the invention, the encrypted output from the encryption technique of the first aspect is decrypted.

In a third aspect of the invention, a second encryption technique on VIL inputs is provided. This technique has a relatively high level of security yet also allows VIL inputs to be used. In this aspect, a hash function is applied to an input, and the output of the hash function has first and second portions, where the first and second portions can be of different sizes. A first function is applied to the second portion, and the output of the first function has a size smaller than the second portion, and preferably the same size as the first portion. In one embodiment, the first function is a block cipher using a first key. The output of the first function is preferably, in some embodiments, added to the first portion, and a second function is applied to the result of this first addition. The second function, in an embodiment, comprises a number of independently keyed block ciphers. The output of the second function is added, through a second addition, to the second portion. An inverse hash function is then applied to the output of the first and second additions, thereby creating an encrypted output.

In a fourth aspect of the invention, the encrypted output from the encryption technique of the third aspect is decrypted.

A more complete understanding of the present invention, as well as further features and advantages of the present invention, will be obtained by reference to the following detailed description and drawings.

DETAILED DESCRIPTION OF PREFERRED EMBODIMENTS

Figure 1:
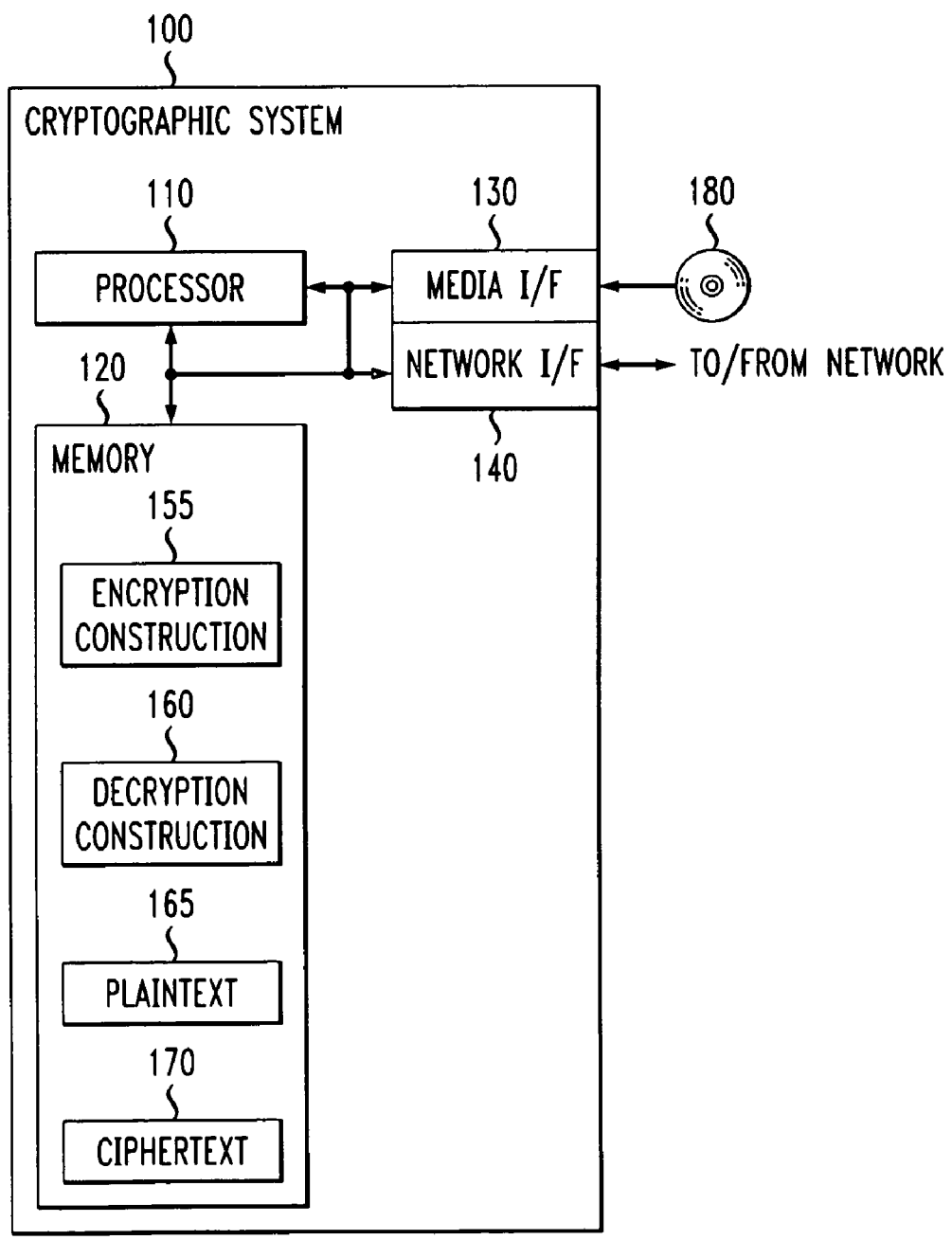
FIG. 1 illustrates a block diagram of an exemplary system implementing cryptographic constructions in accordance with a preferred embodiment of the invention.

The following detailed description is divided into several sections in order to facilitate an organized description of the embodiments of the present invention. In Section 1, an overview of the embodiments of the present invention is given. Section 2 contains a variety of definitions that are used in subsequent sections. Section 3 describes techniques for encrypting and decrypting data using Variable Input Length (VIL) PseudoRandom Permutations (PRP). To simplify understanding, these techniques are presented by showing how conventional techniques may be converted to techniques of the present invention. The VIL PRP encryption and decryption techniques of the present invention are described mathematically and in relation to FIGS. 2 and 3. Section 4 describes techniques for encrypting and decrypting VIL data using Strong-PRP. Basically, PRP is secure against plaintext attacks, while Strong-PRP is secure from both plaintext and ciphertext attacks. Again, these VIL Strong-PRP techniques are presented by showing how conventional techniques may be converted to the techniques of the present invention. Encryption and decryption techniques of the present invention are described mathematically and in relation to FIGS. 4 and 5.

1. Overview

Broadly, techniques of the present invention allow Variable Input Length (VIL) inputs to be encrypted. There are basically two classes of VIL techniques, "variable but fixed" and "variable in and variable out." In the former, an input having one length is converted to an output having the same length. For instance, an input of 1024 bits is converted to an output having 1024 bits. In "variable in and variable out," an input having one length is converted to an output having a different length. For example, an input of 1024 bits is converted to an output having 512 bits. The techniques of the present invention are "variable but fixed" VIL cryptographic techniques. The techniques of the present invention are variable because the size of the input is allowed to vary, as opposed to a fixed input length cryptographic technique where the input must be a particular size or perhaps an integer factor of the particular size. In other words, fixed input length cryptographic techniques can have an input of 1024 bits, for instance, or perhaps 2048 or 4086 bits, while the techniques of the present invention can be designed to operate on 517 bits or 1045, or some other suitable number of bits.

The inputs will be described below as having a size of n+b, where n and b are usually expressed as bits. Generally, $b \geq n$, such as having b be 896 bits and n be 128 bits. However, it is possible for n>b, although this can cause reduced security. The techniques of the present invention use VIL cryptographic primitives to encrypt input messages and decrypt encrypted messages. Input messages are referred to herein as plaintext, whereas encrypted versions of the input messages are referred to herein as ciphertext. The encryption techniques of the present invention are presented herein as constructions of cryptographic primitives, and the decryption techniques are presented as methods. This is solely for convenience, as it is quite easy for those skilled in the art to determine a construction from a method and vice versa.

Referring now to FIG. 1, an exemplary cryptographic system 100 is shown implementing cryptographic constructions and methods in accordance with preferred embodiments of the present invention. Cryptographic system 100 is shown interoperating with a network and a Digital Versatile Disk (DVD) 180. Cryptographic system 100 comprises a processor 110, a memory 120, a media interface 130, and a network interface 140. Memory 120 comprises encryption construction 155, decryption construction 160, plaintext 165, and ciphertext 170.

Encryption construction 155 is a construction using VIL cryptographic primitives to encrypt plaintext 165 into ciphertext 170. Encryption construction 155 may be the construction shown in FIG. 2 or the construction shown in FIG. 4. Additionally, the encryption construction 155 can support both constructions. The former encrypts and decrypts at a higher speed compared to a conventional construction, while the latter has a higher amount of security than conventional constructions and provides VIL cryptography.

Figure 2:
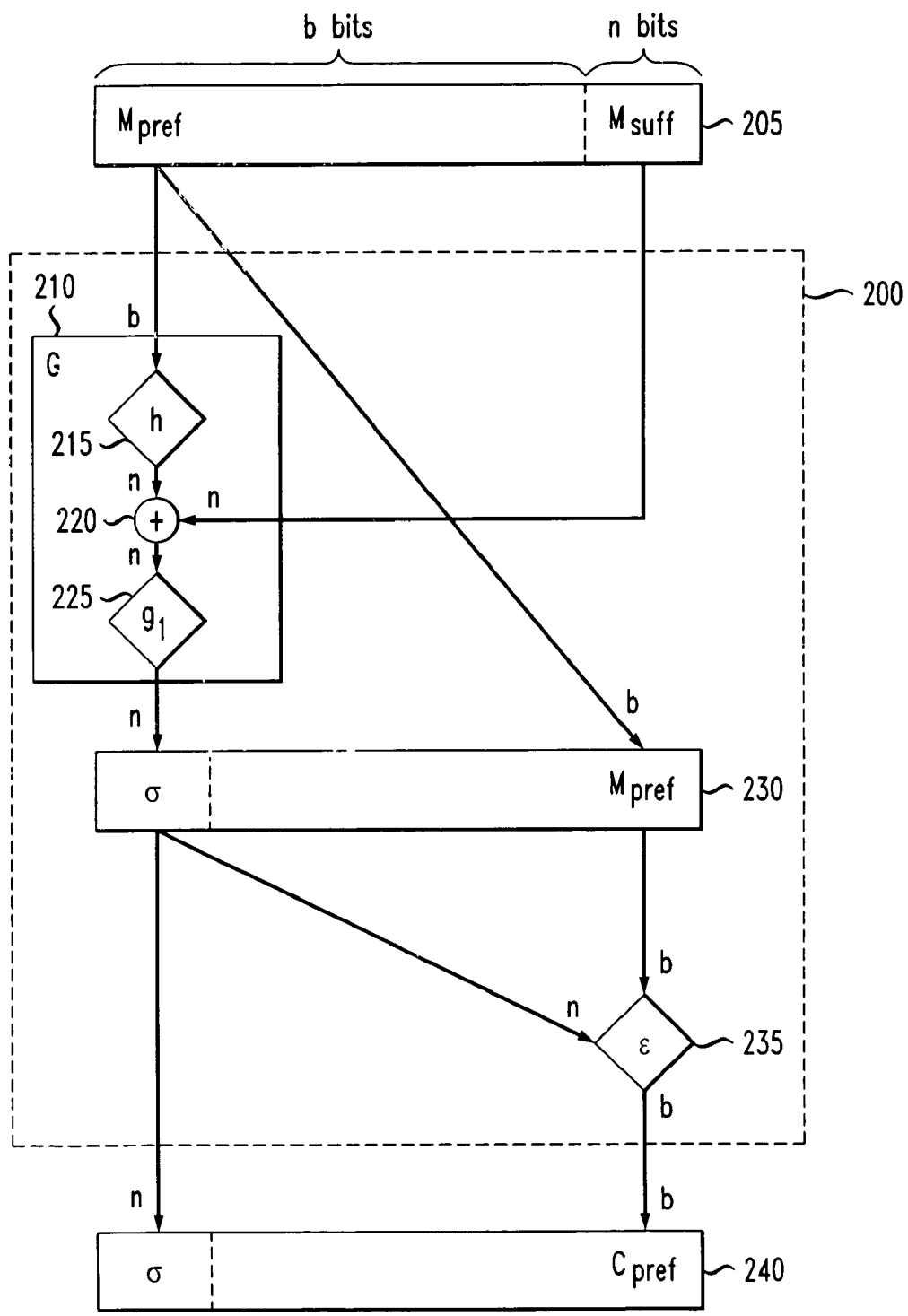
FIG. 2 illustrates a block diagram of a block cipher construction in accordance with a preferred embodiment of the invention.

Decryption construction 160 is a construction using VIL cryptographic primitives to decrypt ciphertext 170 back into plaintext 165. Decryption construction 160 may be the construction shown in FIG. 3 as method 300, if the encryption construction of FIG. 2 is used. Alternatively, the decryption construction 160 may be the construction shown in FIG. 5 as method 500, if the encryption construction shown in FIG. 4 is used. Additionally, the decryption construction 160 can support both constructions.

Although shown separately, the encryption construction 155 and the decryption construction 160 can be part of the same software package, such as an Application Programming Interface (API). These constructions may be added to other software packages, such as packages that support the Internet Protocol (IP) for instance. Moreover, these constructions may be implemented in integrated circuit form, for example, as part of an integrated circuit that performs encryption and decryption for cellular phone data or other wireless data.

Network interface 140 allows the cryptographic system 100 to communicate with a wired, optical, or wireless network. Media interface 130 allows the cryptographic system 100 to receive instructions via a computer-readable medium, such as a hard-drive or DVD 180. As is known in the art, the methods and apparatus discussed herein may be distributed as an article of manufacture that itself comprises a computer-readable medium having computer-readable code means embodied thereon. The computer-readable code means is operable, in conjunction with a device such as cryptographic system 100, to carry out all or some of the steps to perform the methods or create the apparatus discussed herein. The computer-readable medium may be a recordable medium (e.g., floppy disks, hard-drives, memory cards, or optical disks, such as DVD 180) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer system to read instructions and data, such as magnetic variations on a magnetic medium or height variations on the surface of a compact disk, such as DVD 180.

Memory 120 configures its processor 110 to implement the methods, steps, and functions disclosed herein. Memory 120 could be distributed or local and the processor 110 could be distributed or singular. Each memory could be implemented as an electrical, magnetic or optical memory, or any combination of these or other types of storage devices. Moreover, the term "memory" should be construed broadly enough to encompass any information able to be read from or written to an address in the addressable space accessed by processor 110. With this definition, information on a network (e.g., a wired network or a wireless network) is still within a memory, such as memory 120, because the processor, such as processor 110, can retrieve the information from the network. It should be noted that each processor that makes up a distributed processor generally contains its own addressable memory space. It should also be noted that some or all of cryptographic system 100, as discussed above, can be incorporated into an application-specific or general-use integrated circuit.

Before proceeding with a discussion of the constructions of FIGS. 2 through 5, it is helpful to set out some definitions.

2. Definitions

In this section, pseudorandom functions, pseudorandom permutations, and other definitions are presented. Although these primitives are traditionally asymptotic, there is a need to model them in a concrete security framework. This treatment is necessary since fixed input length primitives are handled. Fixed input length primitives are finite objects, and as a result, meaningful security results cannot be captured by a traditional asymptotic treatment. As noted below, some portions of the definitions in this section are also presented in Bellare, Canetti and Krawczyk, "Pseudorandom Functions Revisited: The Cascade Construction and its Concrete Security," 37th Ann. Symp. on Foundations of Comp. Sci., IEEE, 514–523 (1996); and Bellare, Kilian and Rogaway, "The Security of Cipher Block Chaining," Advances in Cryptology, volume 839 of Lecture Notes in Comp. Sci., 341–358 (Yvo G. Desmedt ed.) (1994), the disclosures of which are hereby incorporated by reference.

Notation. If x is a string of bits, then its length is denoted by |x|. If a and b are integers greater than 0, and a<b, then the substring of x starting at bit position a and ending at bit position b (counting from the left) is denoted x[a, . . . ,b]. Let S be a probability space, then the process of picking an element from S according to the underlying probability distribution is denoted $$x \xleftarrow{R} S.$$

The term $I_n$ is synonymous with $\{0,1\}^n$ (the set of bit strings of length n). The set of all functions mapping $I_n$ to $I_m$ is denoted $F_{n,m}$, and set of permutations on $I_n$ is denoted $P_n$.

Computational Model. The convention in Bellare, Kilian and Rogaway, incorporated by reference above, is followed here and an adversary A is modeled as a program for a Random Access Machine. This adversary will have access to an oracle for computing a specified function $f$; it can make black-box queries to this oracle, and it is assumed that it will receive a correct response in unit time. The symbol $A^f$ is used to denote an adversary with access to an oracle for computing function $f$. Following the convention in Bellare, Kilian and Rogaway, incorporated by reference above, the running time of the adversary is defined to be its execution time plus the length of its description. The query complexity of A is defined as the number of queries it makes to its oracle.

Finite Function Families. A finite function family, F, is a collection of functions, all of which have domain Dom(F) and range Range(F). The present focus is on function families in which each function in the family can be formally specified by (at least one) "key." Typically, the key for a function family will be a pre-defined fixed length bit string.

For a function family F, and a key k, let $F_k$ denote the function associated with the given key, and it is assumed that computing $F_k$ at any given point of Dom(F) is easy given the key k.

Examples. Perhaps the simplest example is the set of all functions with domain $I_k$ and range $I_l$, under the uniform distribution. This family is denoted by $Rand^{k \rightarrow l}$. A function in this family can be represented by $k2^l$ bits—hence an appropriate key space is $I_{k2^l}$. Another simple example is the set of all permutations on $I_l$. This family is denoted by $Perm^l$. Any block cipher constitutes a keyed family of permutations. For example, DES has key space $I_{56}$, with domain and range $I_{64}$. DES is described in National Bureau of Standards, Federal Information Processing Standards Publication 46 (1977), the disclosure of which is hereby incorporated by reference.

Distinguishability. The concept of distinguishability helps capture the idea of a "computational distance" between two function families. The concept of distinguishability is described in more detail in Goldreich et al., "How to Construct Random Functions," J. of the ACM 33(4), 792–807, October (1984), the disclosure of which is hereby incorporated by reference. This notion will be useful when pseudorandom functions and permutations are discussed. Suppose that $F^0$ and $F^1$ are two function families that have both identical domains and identical ranges. An adversary A will get oracle access to either a function sampled from $F^0$, or a function sampled from $F^1$. The adversary will not, however, be told whether the oracle really sampled from $F^0$ or $F^1$. The adversary's goal is to determine which function family was actually sampled. Informally, distinguishability corresponds directly to the adversary's success rate in making this determination. In particular, let $$Adv_A(F^0, F^1) = Pr\left[f \xleftarrow{R} F^0 : A^f = 1\right] - Pr\left[f \xleftarrow{R} F^1 : A^f = 1\right],$$

where the probabilities are taken over the choice of $f$ and A's internal coin tosses. Now, it can be said that A(t,q,n, $\in$)-distinguishes $F^0$ from $F^1$, if A runs for time at most t, makes at most q queries to its oracle each length at most n, and $Adv_A(F^0, F^1) \geq \in$.

Pseudorandom Functions and Permutations. Pseudorandomness captures the distance between $Rand^{k \rightarrow l}$, and another function family F with domain $I_k$ and range $I_l$. That is, it captures the extent to which an adversary can tell apart a function chosen from F with a function chosen at random from the family of all possible functions that have the same domain and range as F.

Definition 1. Let F be a keyed function family with domain $I_k$ and range $I_l$. Let A be an adversary that is equipped with an oracle. Then, $$Adv_F^{prf}(A) = Pr\left[f \xleftarrow{R} F : A^f = 1\right] - Pr\left[f \xleftarrow{R} Rand^{k \rightarrow l} : A^f = 1\right].$$

For any integers q,t$\geq$0, an insecurity function, $Adv_f^{prf}(q,t)$, is defined as:

$$Adv_F^{prf}(q, t) = \max_A \{Adv_F^{prf}(A)\}.$$

The above maximum is taken over choices of adversary A that are restricted to running time at most t, and q oracle queries.

The convention of Bellare, Kilian and Rogaway, incorporated by reference above, is used here and the amount of time it takes to perform the sampling operation $$f \xleftarrow{R} F$$

is incorporated into the running time of A as mentioned in the above definition.

The concept of a PseudoRandom Permutation (PRP) family is now considered. This concept was originally defined by Luby et al., "How to Construct Pseudorandom Permutations from Pseudorandom Functions," SIAM J. of Computing 17(2), 373–386 (1988), the disclosure of which is hereby incorporated by reference herein. The original notion considered the computational indistinguishability between a given family of permutations and the family of all functions. Following the treatment of Bellare, Kilian and Rogaway, incorporated by reference above, the pseudorandomness of a permutation family on $I_l$ is measured in terms of its indistinguishability from $Perm^l$.

Definition 2. Let F be a keyed function family with domain and range $I_l$. Let A be an adversary that is equipped with an oracle. Then, $$Adv_F^{prp}(A) = Pr\left[f \xleftarrow{R} F : A^f = 1\right] - Pr\left[f \xleftarrow{R} Perm^l : A^f = 1\right].$$

For any integers q,t>0, an insecurity function, $Adv_F^{prp}(q,t)$, is defined as:

$$Adv_F^{prp}(q, t) = \max_A \{Adv_F^{prp}(A)\}.$$

The above maximum is taken over choices of adversary A that are restricted to running time at most t, and q oracle queries.

Luby, incorporated by reference above, also considered the notion of a strong pseudorandom permutation. In this setting, the adversary is given access to both an oracle that computes the permutation for a given element, and an oracle that computes the inverse of the permutation.

Definition 3. Let F be a keyed function family with domain and range $I_l$. Let A be an adversary that is given access to an oracle. Then, $$Adv_F^{prp}(A) = Pr\left[f \xleftarrow{R} F : A^{f,f^{-1}} = 1\right] - Pr\left[f \xleftarrow{R} Perm^l : A^{f,f^{-1}} = 1\right].$$

For any integers $q,t \geq 0$, an insecurity function, $Adv_F^{prp}(q,t)$, is defined as:

$$Adv_F^{prp}(q, t) = \max_A \{Adv_F^{prp}(A)\}.$$

The above maximum is taken over choices of adversary A that are restricted to running time at most t, and q oracle queries.

The security of a block cipher against chosen plaintext attacks can be understood by examining the block cipher as a pseudorandom permutation, whereas the security against chosen plaintext and ciphertext attacks can be understood by examining the block cipher as a strong pseudorandom permutation.

Universal Hash Functions. Let H be a family of functions with domain D and range S. Also, H comes equipped with an induced distribution (typically uniform). Functions can then be sampled from H according to this distribution. Let $\in$ be a "small" constant such that $1/|S| \leq \in \leq 1$.

Definition 4 (a). H is a universal family of hash functions if for all $x,y \in D$ with $x \neq y$, $Pr_{h \in H}[h(x)=h(y)] \leq 1/|S|$.

Definition 4 (b). H is an $\in$-almost universal family of hash functions if $Pr_{h \in H}[h(x)=h(y)] \leq \in$. An example is the linear congruential hash $h(x)=ax+b \mod p$.

Definition 5 (a). H is a $\Delta$-universal-family of hash functions if for all $x,y \in D$ with $x \neq y$, and all $\delta \in S$, $Pr_{h \in H}[h(x)-h(y)=\delta] \leq 1/|S|$.

Definition 5 (b). H is called $\in$-almost-$\Delta$-universal if $Pr_{h \in H}[h(x)-h(y)=\delta] \leq \in$. An example is the linear hash $h_a(x)=ax \mod p$ with $a \neq 0$.

Definition 6 (a). H is a strongly universal family of hash functions if for all $x,y \in D$ with $x \neq y$ and all $a,b \in S$, $Pr_{h \in H}[h(x)=a,h(y)=b] \leq 1/|S|^2$.

Definition 6 (b). H is called $\in$-almost-strongly-universal family of hash functions if $Pr_{h \in H}[h(x)=a,h(y)=b] \leq \in/|S|$. An example is the linear congruential hash $h(x)=ax+b \mod p$ where a is non-zero and p is a prime.

A remark can be made that, in Definition 6, if H consists only of permutations, then it will be said that H is a strongly universal family of permutations. Another remark can be made that, in Definition 6, if h is drawn from a $\Delta$-universal family of hash functions then is will be said that h is a $\Delta$-universal hash function. Similarly for the other types of hash function families defined above, it will be said that h is a hash function of the corresponding type.

3. FIL PRP to VIL PRP

In this section, VIL encoding and decoding techniques are presented that are faster than comparable conventional techniques and that are secure against plaintext attacks. The problem of constructing a variable input length mode of encryption for block ciphers was considered by Bellare and Rogaway, "On the Construction of Variable-Input-Length Ciphers," Proc. of Fast Software Encryption, Lecture Notes in Comp. Sci. 1636 (1999), the disclosure of which is hereby incorporated by reference. In Bellare and Rogaway, a generic approach is given for solving this problem, and then a specific construction is instantiated. The generic approach involves utilizing a parsimonious pseudorandom function together with a parsimonious encryption scheme. Both CBC-mode encryption and counter-mode encryption (with a random initial counter) serve as examples of parsimonious encryption schemes. In this section, an efficient construction is given for taking an existing fixed input length pseudorandom permutation, and building a variable input length parsimonious pseudorandom function. The techniques of Bellare and Rogaway will be reviewed first in this section, then the techniques of the present invention will be discussed, beginning with the "VIL Parsimonious PRF" section below.

Parsimonious PRF. Let F be a keyed function family with domain $I_k$ and range $I_n$, where $k \geq n$. Then F is called a parsimonious family if, for any key $a \in Keys(F)$, and any input $x \in I_k$, the last n bits of x are uniquely determined by the remaining bits of x, the key a, and $F_a(x)$.

Parsimonious Encryption. A parsimonious encryption scheme may be defined via three algorithms S=(K,E,D). The algorithm K is a key-generation algorithm, and returns a random key k to be used for the encryption. The algorithm E takes this key k and the message M, picks a random, fixed length IV, and then encrypts M to get a ciphertext C=(IV; C*), where C* and M have the same length.

General Scheme for VIL Block Ciphers. Given a parsimonious PRF and encryption scheme, it is possible to construct a general VIL scheme F as follows. Let G be the parsimonious PRF whose domain is the message space and whose range is $I_n$. Let Recover denote G's corresponding recovery algorithm that obtains the last n bits of the message M given the key to G, the first |M|−n bits of M, and the output of G. Let S=(K,E,D) be a parsimonious encryption scheme. Let $K_{prf}$ and $K_{enc}$ be the secret keys for the parsimonious PRF and encryption schemes respectively. Let $M_{pref}$ be the first |M|−n bits of M. The encryption and decryption algorithms are shown below.

Algorithm Encrypt $K_{prf}$; $K_{enc}$ (M)

$$\sigma = G_{K_{prf}}(M)$$

$$C_{pref} = E_{K_{enc}}(M_{pref}; \sigma)$$

return $C = (\sigma; C_{pref})$

Algorithm Decrypt $K_{prf}$; $K_{enc}$ (C)

Let $\sigma$ be first n bits of C.

$M_{pref} = D_{K_{enc}}(C)$ $M_{suff}$ = Recover $K_{prf}(M_{pref}, \sigma)$ return $M = (m_{pref}; M_{suff})$ Security for VIL Mode Encryption. Before giving any security analysis for general VIL Mode block cipher encryption, security is discussed for parsimonious encryption. The security for a parsimonious encryption scheme is defined by the adversary's inability to distinguish the encryption of a message from the encryption of a randomly chosen string of equal length. More formally, if S=(K,E,D) is a parsimonious encryption scheme, and A is a distinguishing adversary, then $$Adv_A^{priv}(S) = Pr[K \leftarrow K : A^{\varepsilon_K(\cdot)} = 1] - Pr\left[K \leftarrow K : A^{\varepsilon_K(\$^{|\cdot|})} = 1\right].$$

In the first experiment, the oracle returns a random encryption of the message under the given key K, and in the second, a random encryption of a random string of the same length as the message (under the key K) is returned. Define $Adv_S^{priv}(t,q,\mu)$ as $\max_A\{Adv_S^{priv}(A)\}$. Here the maximum is taken over all adversaries A who are restricted to time t, and make at most q oracle queries whose total length is no more than $\mu$ bits.

Bellare and Rogaway, incorporated by reference above, proved the following relating the security of their general VIL mode block cipher construction in terms of its constituent parsimonious PRF and encryption scheme: Suppose B is VIL block cipher constructed from the parsimonious PRF family F and the parsimonious encryption scheme S. Moreover, suppose that the functions in F have range $I_n$. Then the following is true:

$$Adv_B^{prp}(t, q, \mu) \leq Adv_F^{prf}(t', q, \mu) + Adv_S^{priv}(t', q, \mu) + \frac{q^2}{2^n},$$

where $t'=t+O(qn+\mu)$.

VIL Parsimonious PRF. It is now shown, in accordance with a preferred embodiment of the present invention, how to efficiently construct a parsimonious PRF that can handle variable input lengths. As pointed out before, the present construction is the most efficient known parsimonious PRF construction. Combining this parsimonious PRF with an existing parsimonious encryption scheme, a very efficient scheme for VIL block cipher encryption is developed. For now, it is assumed that there is a PRP over $I_n$ (any block cipher will work). It is now shown how to construct a parsimonious PRF family with domain $I_{n+b}$ and range $I_n$, where $n \leq b$.

Construction 1. Let P be any pseudorandom permutation family on $I_n$, and let H be an $\in$-almost $\Delta$-universal family of hash functions with domain $I_b$ and range $I_n$. A parsimonious PRF ParG is constructed with domain $I_{n+b}$ and range $I_n$ as follows:

A key of a function sampled from ParG is a pair $\langle h,g \rangle$ where h is sampled from H and g is sampled from P. For every input $x \in I_{n+b}$, the value of $ParG_{h,g}$ is defined as $$ParG_{h,g}(x)=g(h(x[1 \ldots b]) \oplus x[b+1 \ldots n+b]).$$

Although an eXclusive-OR (XOR, or "$\oplus$") function is used above and throughout this detailed description, this function may be replaced by an addition operation in a quasigroup. As is known in the art, a quasigroup is a set with a binary operation "+" with the property that, for $a,b \in Q$, there are unique solutions to the equations a+x=b and y+a=b.

A remark can be made that, if a VIL parsimonious PRF is needed to be constructed for which b<n, a fixed padding may be appended to the input x, to achieve total length 2n. The security bounds proven below remain the same, and almost the exact same security proof will go through. Before security is proved, it is observed that ParG is parsimonious: given the output of $\sigma$ of ParG, its key, and the value x[1 . . . b], it is not difficult to see that x[b+1 . . . n+b]=$g^{-1}(\sigma) \oplus h(x[1 \ldots b])$.

A diagram of a construction that implements Construction 1 above is shown in FIG. 2. Referring now to this figure, a construction 200 is shown accepting an input 205 and producing an output 240. Construction 200 comprises block 210 (denoted as "G" in the figure), an intermediate result 230, and an encryption function 235. Block 210 comprises a hash function 215, an XOR function 220, and a block cipher 225. Block 210 accepts the prefix of the input 205 (shown in the figure as message M) and produces an output of $\sigma$. The prefix, $M_{pref}$ has b bits, while the output $\sigma$ has n bits. Thus, block 210 reduces the size of the prefix $M_{pref}$ in this example. Block 210 is the ParG as described above.

The hash function 215, as described above, is preferably a $\Delta$-universal hash function, which converts the b bits of the prefix $M_{pref}$ to n bits of output. The output of the hash function 215 is added to the suffix, $M_{suff}$ by XOR 220. The output of the XOR 220 is then operated on by block cipher $g_1$, which uses a key, $k_1$ (the key is not shown). Intermediate result 230 comprises the prefix $M_{pref}$ and $\sigma$.

Encryption function 235 is a parsimonious encryption function, as described above. The output of the encryption function 235 is $C_{pref}$, where $C_{pref}=E_{K_{enc}}(M_{pref};\sigma)$. While other random numbers may be used in the encryption block 235, the number σ is preferably used. There are a variety of parsimonious encryption that may be used as encryption function 235. In particular, two suitable parsimonious encryptions, as stated above, are counter-mode encryption and Cipher Block Chaining (CBC) encryption.

In counter-mode encryption, the encryption is as follows: (1) perform a block cipher using a second key on σ (i.e., $g_2(\sigma)$); (2) XOR the result of the block cipher with a first block of $M_{pref}$ to create a first block of $C_{pref}$; (3) perform $g_2(\sigma+1)$; (4) XOR the result of the $g_2(\sigma+1)$ with a second block of $M_{pref}$ to create a second block of $C_{pref}$; (5) continue this process until all blocks of $M_{pref}$ have been processed.

In CBC, the encryption is as follows: (1) take σ and XOR with a first block of $M_{pref}$, then encrypt the output of this addition with a block cipher using a second key, and call the output $O_1$; (2) XOR $O_1$ with a second block of $M_{pref}$, then encrypt the output of this addition with the block cipher, and call the output $O_2$; (3) XOR $O_2$ with a third block of $M_{pref}$, then encrypt the output of this addition with the block cipher, and call the output $O_3$; continue this process until all blocks of $M_{pref}$ have been processed. At the end of this process, $C_{pref}$ has been computed.

The construction 200 produces an output 240, which comprises σ and $C_{pref}$ and which is n+b bits in size. Thus, construction 210 takes an input message of n+b bits in size and produces an encrypted output that is n+b bits in size. A benefit to construction 200 is increased speed over comparable conventional constructions. The construction 210 of the present invention is about twice as fast as the VIL mode of disclosed in Bellare and Rogaway.

Figure 3:
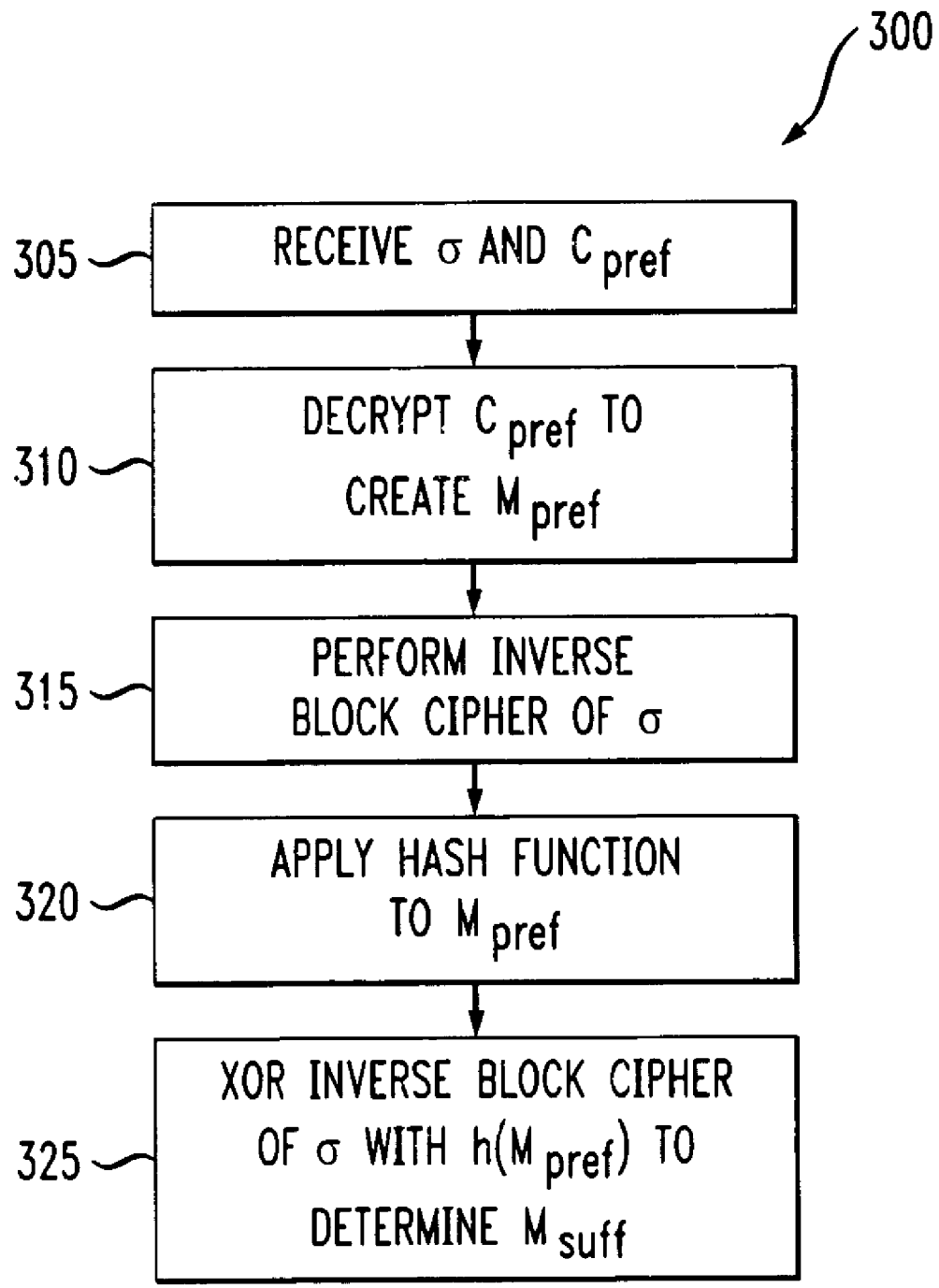
FIG. 3 is a flowchart of a method of decrypting the output of the block cipher construction of FIG. 2.
Figure 4:
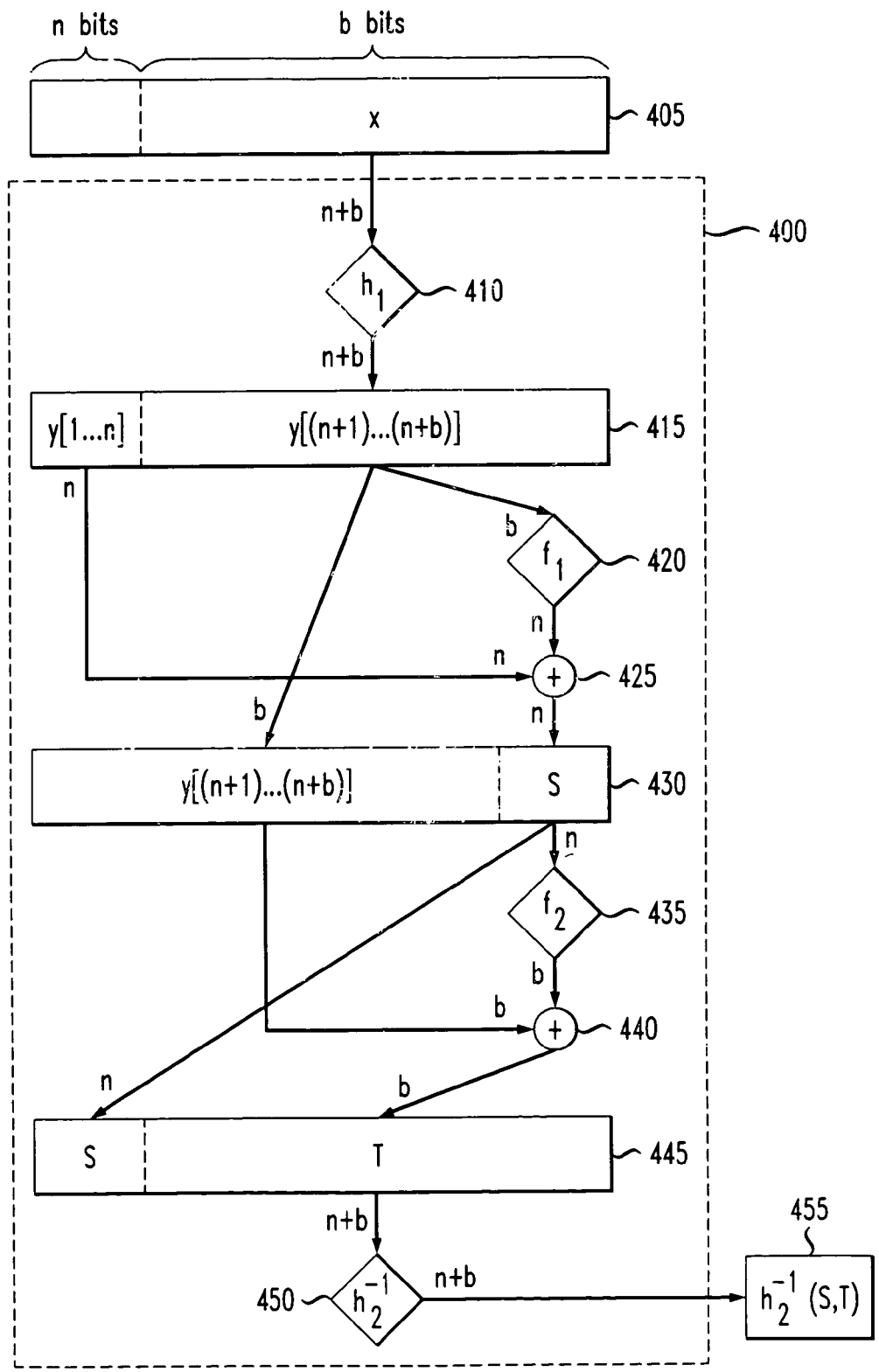
FIG. 4 illustrates a block diagram of a block cipher construction in accordance with another preferred embodiment of the invention.

A method for decryption of output 240 is shown in FIG. 3. Turning now to FIG. 3, method 300 outlines the basic steps involved in decrypting the output of Construction 1. In step 305, an encrypted message (or cyphertext) of σ and $C_{pref}$ is received. In step 310, the prefix $M_{pref}$ is determined by decrypting $C_{pref}$. As explained above, there are multiple possible encryption and corresponding decryption schemes. For example, in counter-mode decryption, the decryption is as follows: (1) perform a block cipher using a second key on σ (i.e., $g_2(\sigma)$); (2) XOR the result of the block cipher with a first block of $C_{pref}$ to create a first block of $M_{pref}$; (3) perform $g_2(\sigma+1)$; (4) XOR the result of the $g_2(\sigma+1)$ with a second block of $C_{pref}$; (5) continue this process until all blocks of $C_{pref}$ have been processed. The output is then $M_{pref}$, which is the output of each XOR.

It should be noted that a benefit to using σ as the random number input to the encryption/decryption function is that σ is available at the decryption location. Consequently, efforts to synchronize the random number input between encryption and decryption locations need not be made.

After step 310, $M_{pref}$ and σ are known, but $M_{suff}$ has yet to be determined. In step 315, an inverse block cipher of σ is performed (i.e., $g_1^{-1}(\sigma)$). It is known that $\sigma=g_1(h(M_{pref})\oplus M_{suff})$; therefore, $g_1^{-1}(\sigma)=h(M_{pref})\oplus M_{suff}$. Consequently, $M_{suff}$ may be determined through $h(M_{pref})\oplus g_1^{-1}(\sigma)=M_{suff}$. In step 320, a hash function is applied to $M_{pref}$, and, in step 325, the XOR between $h(M_{pref})$ and $g_1^{-1}(\sigma)$ is performed. After step 325, both $M_{pref}$ and $M_{suff}$ have been determined.

The security of this aspect of the present invention may be proved as follows. Define ParG as in Construction 1. Let $\in_1$ be the parameter associated with the Δ-universal family of hash functions in the construction, and suppose that the underlying pseudorandom permutation family P utilized by ParG is $(t,q,n,\in_2)$-secure. Then, for any adversary A restricted to t time steps, and q oracle queries of length at most n+b:

$$Adv_{ParG}^{prf}(A) = Pr[g \xleftarrow{R} G : A^g = 1] - Pr[g \xleftarrow{R} Rand^{n+b \to n} : A^g = 1]$$

$$\leq \left(\binom{q}{2}\cdot\epsilon_1\right) + \epsilon_2.$$

First, denote by G the function family obtained if Construction 1 is implemented, but where the pseudorandom permutation family P is replaced with the truly random function family $Rand^{n \to n}$. Then, the proof of the security of this aspect of the present invention will follow immediately if the following inequality is established:

$$Adv_{ParG}^{prf}(A) = Pr[g \xleftarrow{R} G : A^g = 1] - Pr[g \xleftarrow{R} Rand^{n+b \to n} : A^g = 1]$$

$$\leq \binom{q}{2}\cdot\epsilon_1.$$

In order to establish this inequality, first let Φ denote the oracle (either a function from G or $Rand^{n+b \to n}$) that A accesses. If A makes the query x, then it is asking to obtain the value Φ(x). The query-answer pair for the $i^{th}$ query that A makes is defined as: $\langle x_i, y_i\rangle$, where $x_i \in I_{n+b}$ and $y_i \in I_n$. It is assumed that A makes exactly q queries, and the sequence $\langle x_i, y_i\rangle, \ldots, \langle x_q, y_q\rangle$ is called the transcript of A. The standard assumption is made that A is also deterministic (or assume that it is provided with the random tape that maximizes its advantage). Under this assumption, the $i^{th}$ query made by A can be determined from the first i−1 query-answer pairs in A's transcript.

Definition 7. Let $C_A[\{\langle x_i,y_i\rangle, \ldots, \langle x_{i-1},y_{i-1}\rangle\}]$ denote the $i^{th}$ query A makes as a function of the first i−1 query-answer pairs in A's transcript. Let $C_A[\{\langle x_i,y_i\rangle, \ldots, \langle x_q,y_q\rangle\}]$ denote the output A gives as a function of its transcript.

Definition 8. The random variables $T_G$, $T_{Rand^{n+b \to n}}$ denote the transcript seen by A when its queries are answered by functions drawn from G, $Rand^{n+b \to n}$, respectively.

Observe that according to the above definitions and assumptions, $A^G$ and $C_A(G)$ denote the same random variable as do $A^{Rand^{n+b \to n}}$ and $C_A(T_{Rand^{n+b \to n}})$.

A bound is now obtained on the advantage A will have in distinguishing between $T_G$ and $T_{Rand^{n+b \to n}}$. It turns out that $T_G$ and $T_{Rand^{n+b \to n}}$ are identically distributed unless some rare event depending upon the choice of hash function h in G occurs. This event is called "BAD" herein and a bound is obtained on the probability that it actually occurs. Before proceeding, a convention is stated as follows:

For any possible transcript $\sigma=\{\langle x_i,y_i\rangle, \ldots, \langle x_q,y_q\rangle\}$ produced by A, it is assumed from now on that if i≠j then $x_i \neq x_j$. This formalizes the concept that A never repeats a query if it can determine the answer from a previous query-answer pair.

Definition 9. For every specific choice of ∈-universal hash function h define BAD(h) to be set of all possible transcripts $\sigma=\{\langle x_1,y_1\rangle, \ldots, \langle x_q,y_q\rangle\}$ produced by A satisfying the following: there exists 1≤i<j≤m such that $h(x_i[1 \ldots b])+x_i[b+1 \ldots n+b]=h(x_j[1 \ldots b])+x_j[b+1 \ldots n+b]$.

The probability that this bad event occurs is now bounded through the following argument. Let $h \in H$ be an $\in_1$-almost-$\Delta$-universal hash function. Then, for any possible transcript $\sigma = \{\langle x_1, y_1 \rangle, \ldots, \langle x_q, y_q \rangle\}$ produced by A, it is true that $Pr_h[\sigma \in BAD(h)] \leq \binom{q}{2} \in_1$.

A proof of the statement in the previous paragraph is as follows. For a fixed i,j with $1 \neq j$, then it is known by statements given above that $x_i \neq x_j$. Thus, if $x_i[1 \ldots b] = x_j[1 \ldots b]$ it must be that $x_i[b+1 \ldots n+b] \neq x_j[b+1 \ldots n+b]$, from which it follows that $h(x_i[1 \ldots b]) + x_i[b+1 \ldots n+b] \neq h(x_j[1 \ldots b]) + x_j[b+1 \ldots n+b]$. If $x_i[1 \ldots b] \neq x_j[1 \ldots b]$ then by definition of h, it follows that $Pr_h[h(x_i[1 \ldots b]) + x_i[b+1 \ldots n+b] = h(x_j[1 \ldots b]) + x_j[b+1 \ldots n+]] \leq \in_1$. If a union bound is applied, and the sum is taken over all possible pairs i,j, then the statement made above immediately follows.

An important observation for proving the correctness of Construction 1 is the following. Let $\sigma = \{\langle x_1, y_1 \rangle, \ldots, \langle x_q, y_q \rangle\}$ be a possible transcript produced by M. Then:

$$Pr_G[T_G = \sigma \mid \sigma \notin Bad(h)] = Pr_{Rand^{n+b \to n}}[T_{Rand^{n+b \to n}} = \sigma],$$

where h is part of the key for G.

A proof of the statements of the previous paragraph is as follows. Since $Rand^{n+b \to n}$ represents a truly random function, and the inputs $x_i$ to $Rand^{n+b \to n}$ are distinct, it follows that $Pr_{Rand^{n+b \to n}}[T_{Rand^{n+b \to n} = \sigma}] = 2^{-nq}$. Now, if $\sigma \notin BAD(h)$, it follows that $h(x_i[1, \ldots, b]) + x_i[b+1, \ldots, n+b] \neq h(x_j[1, \ldots, b]) + x_j[b+1, \ldots, n+b]$ for all $1 \leq i < j \leq q$. Thus, if the key for G is $\langle h, g \rangle$, then all the inputs to g will be distinct. Therefore the output values will be independently and identically distributed. It can finally be determined that $Pr_G[T_G = \sigma \mid \sigma \notin BAD(h)] = 2^{-nq}$, and the lemma follows.

The main security theorem may now be proven as follows.

Let $T_1$ be the set of all transcripts that A can produce for which $C_A(\sigma) = 1$ and let $T_2$ be the set of all transcripts that A can produce for which $C_A(\sigma) = 0$. Let $T = T_1 \cup T_2$. Note that T denotes the set of all possible transcripts that A could produce. The advantage that A will have in distinguishing between G and $Rand^{n+b \to n}$ may be bounded as follows:

$$\left| Pr[g \xleftarrow{R} Rand^{n+b \to n} : A^{Rand^{n+b \to n}} = 1] - Pr[g \xleftarrow{R} G : A^g = 1] \right| = \quad (1)$$

$$\left| Pr_{Rand^{n+b \to n}}[C_A(T_{Rand^{n+b \to n}}) = 1] - Pr_G[C_A(T_G) = 1] \right| = \quad (2)$$

$$\left| \sum_{\sigma \in T} Pr_G[C_A(\sigma) = 1 \mid T_{Rand^{n+b \to n}} = \sigma] \cdot Pr_{Rand^{n+b \to n}}[T_{Rand^{n+b \to n}} = \sigma] - \quad (3)$$

$$\sum_{\sigma \in T} Pr_G[C_A(\sigma) = 1 \mid T_G = \sigma] \cdot Pr_{Rand^{n+b \to n}}[T_G = \sigma] \right| \quad (4)$$

Now, if $\sigma \in T_1$, then $Pr[C_A(\sigma) = 1] = 1$, and if $\sigma \in T_2$, then $Pr[C_A(\sigma) = 1] = 0$. Expressions (3) and (4) may be simplified to the following:

$$\left| \sum_{\sigma \in T_1} \left( Pr_{Rand^{n+b \to n}}[T_{Rand^{n+b \to n}} = \sigma] - Pr_G[T_G = \sigma] \right) \right| \leq \quad (5)$$

$$\left| \left( Pr_{Rand^{n+b \to n}}[T_{Rand^{n+b \to n}} = \sigma] - \right. \right. \quad (6)$$

$$\left. Pr_G[T_G = \sigma \mid \sigma \notin Bad(h)] \right) \cdot Pr_G[\sigma \notin Bad(h)] \Big| +$$

$$\left| \sum_{\sigma \in T_1} \left( Pr_{Rand^{n+b \to n}}[T_{Rand^{n+b \to n}} = \sigma] - \right. \right. \quad (7)$$

$$\left. Pr_G[T_G = \sigma \mid \sigma \in Bad(h)] \right) \cdot Pr_G[\sigma \in Bad(h)] \Big|$$

Now, observe that, from the observation for proving the correctness of Construction 1 described above, it follows that expression (6) is equal to 0. The proof of may be completed as follows:

$$\left| \sum_{\sigma \in T_1} \left( Pr_{Rand^{n+b \to n}}[T_{Rand^{n+b \to n}} = \sigma] - \right. \right. \quad (8)$$

$$\left. Pr_G[T_G = \sigma \mid \sigma \notin Bad(h)] \right) \cdot Pr_G[\sigma \notin Bad(h)] \Big| \leq$$

$$\max_{\sigma} Pr_G[\sigma \in Bad(h)] \leq \quad (9)$$

$$\binom{q}{2} \in_1. \quad (10)$$

Equation (9) follows from (8) by observing that for any positive values a,b, it holds that $|a - b| \leq \max\{a, b\}$. Moreover, the quantities being dealt with are probabilities, so they sum to at most 1. The last equation follows from the previous by applying the fact, proven above, that, for any possible transcript $\sigma = \{\langle x_1, y_1 \rangle, \ldots, \langle x_q, y_q \rangle\}$ produced by A, it is true that $Pr_h[\sigma \in BAD(h)] \leq \binom{q}{2} \in_1$.

4. FIL PRP to VIL Strong-PRP

This section provides techniques for VIL encryption and decryption that are secure from both chosen plaintext and chosen ciphertext attacks. Now it is shown how to convert a fixed input length block cipher, which is secure against either chosen plaintext attacks or chosen ciphertext attacks, to a VIL block cipher, which is secure against both chosen plaintext and ciphertext attacks. The idea is to first treat the original PRP as pseudorandom function and create two different variable input length pseudorandom functions of specific lengths from it. Finally, these functions are used in an unbalanced Feistel network together with universal hash functions in the right places to yield the desired result. The construction of the present invention and outlined in this section works when it is desirable to convert a block cipher on $I_n$ to a cipher on $I_{n+b}$ where $b \geq n$. These ideas can be extended to work for the case when b<n, but there is a loss in security.

Construction 2. In this aspect of the invention, let P be any pseudorandom permutation family on $I_n$, let H be a family of pairwise independent permutations (i.e., strongly universal hash permutations) on $I_{n+b}$, and let H' be a universal family of hash functions with domain $I_b$ and range $I_n$. Define $f_1$ and $f_2$ as follows:

$$f_1(x) = P_{k_0}(h_1'(x)),$$

$$f_2(S) = (P_{k_1}(S), P_{k_2}(S), \ldots, P_{k_r}(S))[1, \ldots, b],$$

where $$r = \left\lceil \frac{b}{n} \right\rceil$$

and $P_{k_0}$, $P_{k_1}$, ..., $P_{k_r}$ are independently keyed permutations drawn from P, and $h_1'$ is drawn from H'. The notation $[1, \ldots, b]$ means that $f_2(S)$ operates on b bits. Now, define a new permutation family P' which maps input $X \in i_{n+b}$ to $$h_2^{-1}$$

(S,T) where:

$$y = h(x),$$

$$S = y[1, \ldots, n] \oplus f_1(y[n+1, \ldots, n+b]), \text{ and}$$

$$T = y[n+1, \ldots, n+b] \oplus f_2(S).$$

A diagram of a construction that implements Construction 2 above is shown in FIG. 4. Referring now to this figure, a construction 400 is shown accepting an input 405 and producing an output 455. Construction 400 comprises a first hash function 410, a number of intermediate values 415, 430, and 445, two functions 420 and 435, two XOR operators 425 and 440, and an inverse of a second hash function 450.

The hash function 410 operates on the input, x, 405 to produce an output, y, 415. The output 415 is into two portions, one with n bits (y[1 . . . n]) and one with b bits (y[(n+1) . . . (n+b)]). The first function 420 operates on the b bits of Y and produces an output having n bits. Generally, $b \geq n$, although this is not strictly required. The first function 420 is preferably a block cipher, which uses a first key, and that operates on an output of a universal hash function. Mathematically, first function 420 preferably is $$f_1(x) = p_{k_0}(h_1'(x)),$$

as described above.

The output of the first function 420 is XORed by XOR 425 with the n bits of y (i.e., y[1 . . . n]). The result is S, stored in intermediate value 430, and operated on by a second function 435. Second function 435 accepts n bits as input and outputs b bits. The second function 435 is preferably $f_2(S) = (P_{k_1}(S), P_{k_2}(S), \ldots, P_{k_r}(S))[1, \ldots, b]$, as described above. The output of function 435 is XORed by XOR 440 with the b bits of y[(n+1) . . . (n+b)]. The output of the XOR 440 is T. The output 455 (of $h_2^{-1}(S,T)$) is determined by performing an inverse hash function on the intermediate value 445.

A benefit to the construction 400 is high security (strong-PRP) and variable input. A conventional construction only support input lengths of k and integer multiples (such as 2k and 3k) thereof. With construction 400, there is no such limitation, and the input can be of any length.

Figure 5:
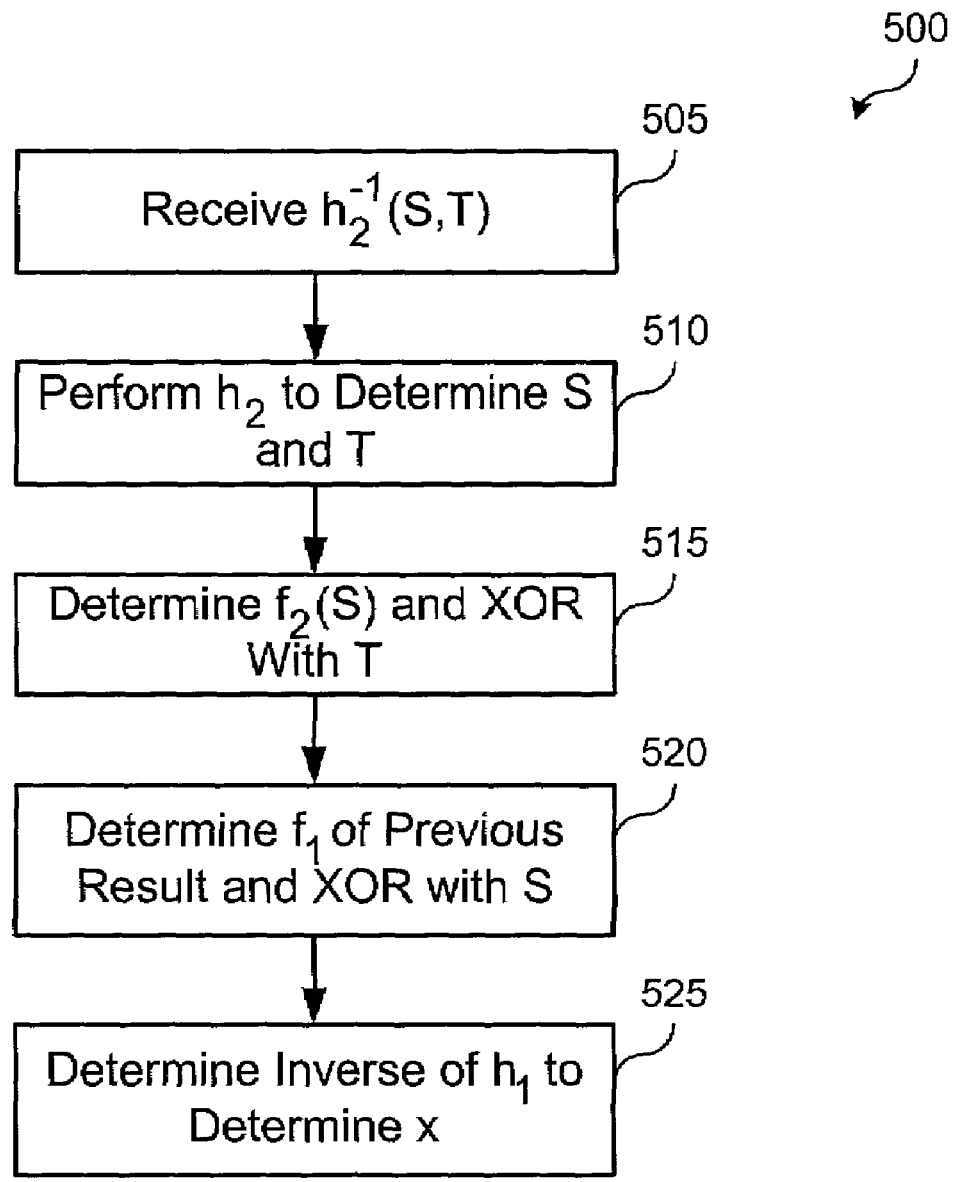
FIG. 5 is a flowchart of a method of decrypting the output of the block cipher construction of FIG. 4.

FIG. 5 shows a method for decrypting output 455 of FIG. 4. Turning now to FIG. 5, method 500 starts when an encrypted message $h_2^{-1}(S,T)$ is received. A hash function is performed to determine S and T in step 510. Mathematically, this step performs $h_2(S,T)$. It should be noted that $(S,T) = h_2(h_2^{-1}(S,T))$. It is known that $T = y[n+1, \ldots, n+b] \oplus f_2(S)$. Therefore, $T \oplus f_2(S) = y[n+1, \ldots, n+b]$. In step 515, $f_2(S)$ is determined and this result is XORed with T to determine $y[n+1, \ldots, n+b]$.

It is also known that $S = y[1, \ldots, n] \oplus f_1(y[n+1, \ldots, n+b])$. Therefore, $S \oplus f_1(y[n+1, \ldots, n+b]) = y[1, \ldots, n]$. Consequently, in step 520, $f_1(y[n+1, \ldots, n+b])$ is determined and this result is XORed with S to determine $y[1, \ldots, b]$. In step 525, an inverse of the first hash function is taken to determine the input message, x. Mathematically, this step performs $x = h_1^{-1}(y)$.

The following may be proven. Let P be a $$\left(t, \left(1 + \left\lceil \frac{b}{n} \right\rceil\right) q, n, \in_1\right) - \text{secure}$$

pseudorandom permutation family on $I_n$, let H be a family of pairwise independent permutations on $I_{n+b}$, let H' be an $\in_2$ universal family of hash functions with domain $I_b$ and range $I_n$, and let P' be the permutation family defined above. Then P' is (t,q,n+b,epsilon') secure where:

$$\in' = (_2{}^q)(\tfrac{1}{2}{}^n + \tfrac{1}{2}{}^b + \tfrac{1}{2}{}^{n+b-1} + \in_2) \in_1.$$

The proof follows by first utilizing the framework of Naor and Reingold's (discussed in Naor and Reingold, already incorporated by reference above) which can be used to analyze unbalanced Feistel networks, when the underlying round functions are truly random. The security of Construction 2 may be analyzed by several applications of the triangle inequality in a hybrid argument in which the truly random functions are replaced with $f_1$ and $f_2$ as above.

It is to be understood that the embodiments and variations shown and described herein are merely illustrative of the principles of this invention and that various modifications may be implemented by those skilled in the art without departing from the scope and spirit of the invention.

We claim:

1. A method of encrypting an input, comprising:
    applying a hash function to a first portion of the input to create a hash function output, the input further comprising a second portion, wherein the first portion and second portion can be of different sizes;
    adding the output of the hash function and the second portion of the input to create an adder output; and
    applying a block cipher to the adder output to create a block cipher output, whereby an encrypted version of the input comprises the block cipher output and the first portion.

2. The method of claim 1, further comprising the step of applying an encryption function to the first portion of the message to create a ciphertext portion, the encryption function using a random number, whereby the block cipher output and the ciphertext portion comprise an encrypted version of the input.

3. The method of claim 2, wherein the random number is the block cipher output.

4. The method of claim 3, wherein the step of adding the output of the hash function and the second portion of the input to create an adder output further comprises the step of performing an addition operation, defined over a quasigroup, on the output of the hash function and the second portion.

5. The method of claim 4, wherein the step of performing an addition operation, defined over a quasigroup, on the output of the hash function and the second portion further comprises the step of performing an exclusive-or (XOR) on the output of the hash function and the second portion.

6. The method of claim 5, wherein:
the first portion and the ciphertext portion have sizes of b;
the second portion and the output of the hash function have sizes of n, wherein b>n.

7. The method of claim 6, wherein the hash function is a Δ-universal hash function and wherein the block cipher uses a predetermined key.

8. The method of claim 7, wherein the encryption function comprises counter-mode encryption.

9. The method of claim 7, wherein the encryption function comprises cipher block chaining encryption.

10. An apparatus for encrypting an input, comprising:
a hash function device adapted to apply a hash function to a first portion of the input and adapted to create a hash function output, the input further comprising a second portion, wherein the first portion and second portion can be of different sizes;
an adder adapted to add the output of the hash function and the second portion of the input to create an adder output; and
a block cipher device adapted to apply a block cipher to the adder output and adapted to create a block cipher output, whereby an encrypted version of the input comprises the block cipher output and the first portion.

11. A method for decryption, comprising:
applying a decryption function to a second portion of received data, the received data comprising a first portion and the second portion, the decryption function outputting a decryption portion;
performing an inverse block cipher of the first portion to create a first value;
applying a pairwise independent hash function to the decryption portion to create a hash function output; and
adding the hash function output and the first value to create a second value, whereby the decryption portion and the second value are a decrypted output.

12. The method of claim 11, wherein the step of adding the hash function output and the first value to create a second value further comprises the step of performing an addition operation, defined over a quasigroup, on the hash function output and the first value to create a second value.

13. The method of claim 12, wherein the step of performing an addition operation, defined over a quasigroup, on the hash function output and the first value to create a second value further comprises the step of performing an exclusive-or (XOR) on the hash function output and the first value to create a second value.

14. An apparatus, comprising:
a decryption function mechanism applied to a second portion of received data, the received data comprising a first portion and the second portion, the decryption function mechanism adapted to output a decryption portion;
an inverse block cipher device adapted to perform an inverse block cipher of the first portion to create a first value;
a hash function device adapted to perform a hash function on the decryption portion to create a hash function output; and
an adder adapted to add the hash function output and the first value to create a second value, whereby the decryption portion and the second value are a decrypted output.

15. A method for encryption, comprising:
applying a first function to a second portion of data, the data comprising a first portion and the second portion, wherein the first and second portions can be of different sizes, and wherein the first function produces a first value having a size smaller than a size of the second portion;
adding the first portion and the output of the first function to produce a second value;
applying a second function to the second value, the second function producing a third value having a size larger than the size of the second value; and
adding the second portion and the third value to produce a fourth value, whereby the second value and the fourth value comprise an encrypted version of the data.

16. The method of claim 15, wherein:
the step of adding the first portion and the output of the first function to produce a second value further comprises the step of performing an addition operation, defined over a quasigroup, on the first portion and the output of the first function to produce the second value; and
the step of adding the second portion and the third value to produce a fourth value further comprises the step of performing an addition operation, defined over a quasigroup, on the second portion and the third value to produce the fourth value.

17. The method of claim 16, wherein:
the step of performing an addition operation, defined over a quasigroup, on the first portion and the output of the first function to produce the second value further comprises the step of performing an exclusive or (XOR) of the first portion and the output of the first function to produce the second value; and
the step of performing an addition operation, defined over a quasigroup, on the second portion and the third value to produce the fourth value further comprises the step of performing an exclusive or (XOR) of the second portion and the third value to produce the fourth value.

18. The method of claim 15, wherein:
the method further comprises the step of applying a pairwise independent hash function to an input to create a hash function output, wherein the hash function output is the data; and
the step of applying a first function to a second portion of data further comprises the step of applying the first function to the second portion of the hash function output.

19. The method of claim 18, wherein:
the method further comprises the step of applying an inverse pairwise independent hash function to a fifth value comprising the second and fourth values, the inverse pairwise independent hash function producing an inverse hash function output, the inverse hash function output comprising an encrypted version of the input.

20. The method of claim 15, wherein:
the method further comprises the step of applying an inverse pairwise independent hash function to a fifth value comprising the second and fourth values, the inverse pairwise independent hash function producing an inverse hash function output, the inverse hash function output comprising an encrypted version of the data.

21. The method of claim 19, wherein:
the first portion has a size of n and the second portion has a size of b, wherein b is greater than n, wherein the data and the input have sizes of n+b;
the sizes of the first and second values are n bits; and
the sizes of the third and fourth values are b bits.

22. The method of claim 21, wherein the first function comprises a universal hash function producing an output operated on by a block cipher that uses a first key.

23. The method of claim 22, wherein the second function comprises a number of independently keyed block ciphers, the number of block ciphers equivalent to $\left\lceil \frac{b}{n} \right\rceil$.

24. An apparatus for encryption, comprising:
a first function device adapted to apply a first function to a second portion of data, the data comprising a first portion and the second portion, wherein the first and second portions can be of different sizes, and wherein the first function device is adapted to produce a first value having a size smaller than a size of the second portion;
a first adder adapted to add the first portion and the output of the first function to produce a second value;
a second function device adapted to apply a second function to the second value, the second function device adapted to produce a third value having a size larger than the size of the second value; and
a second adder adapted to add the second portion and the third value to produce a fourth value, whereby the second value and the fourth value comprise an encrypted version of the data.

25. A method for decryption, comprising:
applying a first function to a first portion of data to produce a first function output, the first function increasing a size of the first portion, wherein the data comprises the first portion and a second portion;
adding the first function output and the second portion to produce a first value;
applying a second function to the first value to produce a second value, the second function reducing a size of the first value; and
adding the second value and the first portion to produce a third value, whereby the third value and the first value comprise a decrypted version of the data.

26. The method of claim 25, wherein:
the step of adding the first function output and the second portion to produce a first value further comprises the step of performing an addition operation, defined over a quasigroup, on the first function output and the second portion to produce the first value; and
the step of adding the second value and the first portion to produce a third value further comprises the step of performing an addition operation, defined over a quasigroup, on the second value and the first portion to produce the third value.

27. The method of claim 26, wherein:
the step of performing an addition operation, defined over a quasigroup, on the first function output and the second portion to produce a first value further comprises the step of performing an exclusive-or (XOR) on the first function output and the second portion to produce a first value; and
the step of performing an addition operation, defined over a quasigroup, on the second value and the first portion to produce a third value further comprises the step of performing an exclusive-or (XOR) on the second value and the first portion to produce a third value.

28. The method of claim 25 further comprising the step of performing a first pairwise independent hash function on received data, the first pairwise independent hash function producing a hash function output, wherein the hash function output is the data.

29. The method of claim 28 further comprising the step of applying an inverse of a second pairwise independent hash function to a fourth value comprising the first and third values, whereby an output of the second pairwise independent hash function is a decrypted version of the received data.

30. The method of claim 29, wherein:
the first portion has a size of n and the second portion has a size of b, where b is greater than n, whereby the received data and the data have sizes of n+b;
sizes of the first function output and the first value are b;
sizes of the second value and third value are n;
a size of the fourth value is n+b bits;
the first function is a block cipher using a first key; and
the second function comprises a number of independently keyed block ciphers, the number of block ciphers equivalent to $\left\lceil \frac{b}{n} \right\rceil$.

31. The method of claim 30, wherein:
the first function comprises a universal hash function producing an output operated on by a block cipher that uses a first key; and
the second function comprises a number of independently keyed block ciphers, the number of block ciphers equivalent to $\left\lceil \frac{b}{n} \right\rceil$.

32. The method of claim 25, further comprising the step of applying an inverse of a second pairwise independent hash function to a fourth value comprising the first and third values, whereby an output of the second pairwise independent hash function is a decrypted version of the data.

33. An apparatus for decryption, comprising:
a first function device adapted to perform a first function on a first portion of data to produce a first function output, the first function increasing a size of the first portion, wherein the data comprises the first portion and a second portion;

a first adder adapted to add the first function output and the second portion to produce a first value;

a second function device adapted to apply a second function to the first value to produce a second value, the second function reducing a size of the first value; and a second adder adapted to add the second value and the first portion to produce a third value, whereby the third value and the first value comprise a decrypted version of the data.

* * * * *

UNITED STATES PATENT AND TRADEMARK OFFICE
CERTIFICATE OF CORRECTION

PATENT NO. : 7,221,756 B2  
APPLICATION NO. : 10/113666  
DATED : May 22, 2007  
INVENTOR(S) : Sarvar Patel Page 1 of 1

It is certified that error appears in the above-identified patent and that said Letters Patent is hereby corrected as shown below:

In the Specifications:

In column 15, line 7, " $P_{k_o}$ " should be replaced by -- $p_{ko}$ --.

In column 15, line 9, " $(P_{k1}(S), p_{k2}(S), ..., P_{kr}(S)$ " should be replaced by -- $(p_{k1}(S), p_{k2}(S), ..., p_{kr}(S)$ --.

In column 15, line 18, " $P_{ko}, P_{k1}, ..., P_{kr}$ " should be replaced by -- $p_{ko}, p_{k1}, ..., p_{kr}$ --.

Signed and Sealed this  
Fourth Day of June, 2013

Teresa Stanek Rea  
*Acting Director of the United States Patent and Trademark Office*